US011073456B2

(12) United States Patent
Kawazoe

(10) Patent No.: US 11,073,456 B2
(45) Date of Patent: Jul. 27, 2021

(54) HARDNESS TESTER

(71) Applicant: MITUTOYO CORPORATION, Kanagawa (JP)

(72) Inventor: Masaru Kawazoe, Hiroshima (JP)

(73) Assignee: MITUTOYO CORPORATION, Kanagawa (JP)

(*) Notice: Subject to any disclaimer, the term of this patent is extended or adjusted under 35 U.S.C. 154(b) by 119 days.

(21) Appl. No.: 16/589,513

(22) Filed: Oct. 1, 2019

(65) Prior Publication Data

US 2020/0110013 A1 Apr. 9, 2020

(30) Foreign Application Priority Data

Oct. 3, 2018 (JP) .............................. JP2018-187836

(51) Int. Cl.
*G01N 3/42* (2006.01)

(52) U.S. Cl.
CPC ........ *G01N 3/42* (2013.01); *G01N 2203/0035* (2013.01)

(58) Field of Classification Search
CPC ..... G01N 3/42; G01N 3/44; G01N 2203/0035
See application file for complete search history.

(56) References Cited

U.S. PATENT DOCUMENTS

| 4,019,376 A * | 4/1977 | Iwasaki ................... G01N 3/42 73/81 |
| 4,435,976 A * | 3/1984 | Edward, Jr. .............. G01N 3/44 73/83 |
| 6,336,359 B1 * | 1/2002 | Kawazoe ................. G01N 3/40 73/81 |
| 8,566,735 B2 | 10/2013 | Takemura et al. |
| 8,578,284 B2 | 11/2013 | Takemura et al. |
| 8,849,588 B2 | 9/2014 | Sawa et al. |
| 8,887,558 B2 | 11/2014 | Kawazoe |
| 9,003,871 B2 | 4/2015 | Sadahiro |
| 9,032,784 B2 | 5/2015 | Ariga |
| 9,063,048 B2 | 6/2015 | Koshimizu |
| 9,111,332 B2 | 8/2015 | Miyakura |
| 9,146,185 B2 | 9/2015 | Sadahiro |
| 9,207,156 B2 | 12/2015 | Ariga et al. |

(Continued)

FOREIGN PATENT DOCUMENTS

JP 2003-50189 A 2/2003

OTHER PUBLICATIONS

U.S. Appl. No. 16/587,213 to Masaru Kawazoe et al., filed Sep. 30, 2019.

*Primary Examiner* — David Z Huang
(74) *Attorney, Agent, or Firm* — Greenblum & Bernstein, P.L.C.

(57) ABSTRACT

A test force generating spring that is interposed between an indenter shaft provided with an indenter at a distal end and a press that linearly displaces the indenter shaft toward a sample stage so as to press the indenter into a surface of a sample is configured as an annular spring having left/right symmetry, the annular spring including a left/right pair of through-holes that are formed running from one side surface of a substantially rectangular metal block to another side surface on a rear side of the block and a slit that is formed so as to connect the pair of through-holes. With this configuration, a highly accurate test force can be generated and a hardness test can be favorably performed by a hardness tester.

4 Claims, 3 Drawing Sheets

(56) References Cited

U.S. PATENT DOCUMENTS

| | | |
|---|---|---|
| 9,291,538 B2 | 3/2016 | Sawa |
| 9,341,554 B2 | 5/2016 | Tsujii et al. |
| 9,366,609 B2 | 6/2016 | Kataoka |
| 9,417,171 B2 | 8/2016 | Takemura et al. |
| 9,442,054 B2 | 9/2016 | Takemura et al. |
| 9,442,056 B2 | 9/2016 | Koshimizu et al. |
| 10,024,774 B2 | 7/2018 | Koshimizu et al. |
| 10,094,753 B2 | 10/2018 | Sawa et al. |
| 10,163,201 B2 | 12/2018 | Sawa et al. |
| 10,495,557 B2 | 12/2019 | Tsujii et al. |
| 2009/0260427 A1 * | 10/2009 | Woirgard ............ G01Q 60/366 73/85 |
| 2014/0177937 A1 | 6/2014 | Ariga et al. |
| 2016/0018308 A1 | 1/2016 | Kataoka et al. |
| 2017/0102305 A1 | 4/2017 | Tsujii et al. |
| 2017/0122856 A1 | 5/2017 | Koshimizu |
| 2018/0284000 A1 | 10/2018 | Koshimizu et al. |
| 2018/0313730 A1 | 11/2018 | Yano et al. |
| 2019/0128787 A1 | 5/2019 | Sadahiro |

* cited by examiner

HARDNESS TESTER

CROSS-REFERENCE TO RELATED APPLICATIONS

The present application claims priority under 35 U.S.C. § 119 of Japanese Application No. 2018-187836, filed on Oct. 3, 2018, the disclosure of which is expressly incorporated by reference herein in its entirety.

BACKGROUND OF THE INVENTION

1. Field of the Invention

The present invention relates to a hardness tester.

2. Description of Related Art

Conventionally, a hardness tester is known which measures hardness of a sample by loading a predetermined test force onto a surface of a sample (work piece) using an indenter to form an indentation. For example, a Rockwell hardness tester is a tester that measures the hardness of a sample by loading a predetermined test force on a surface of the sample with a diamond conical indenter or a ball indenter to form an indentation, and measuring a pressing depth of the indenter during indentation formation (see, for example, Japanese Patent Laid-open Publication No. 2003-050189). In this hardness tester, the test force is generated by a servo motor deforming a cantilever plate spring. Specifically, the hardness tester includes a test force generating mechanism that measures an amount of deformation of the cantilever plate spring and controls the amount of deformation with a servo motor, enabling a test force of 3 to 187.5 kgf, for example, to be generated.

However, when attempting to generate a large test force with the hardness tester of Japanese Patent Laid-open Publication No. 2003-050189, the cantilever plate spring is greatly deformed, and when this occurs, stress concentrates in a fixed end of the plate spring, for example, and may damage the plate spring. Therefore, increasing a dynamic range of the test force in this hardness tester is difficult. Also, when the cantilever plate spring of this hardness tester is deformed, a free end of the plate spring moves in an arc, and therefore a mechanism must be added to the test force generating mechanism that offsets shifts in the position of the free end of the plate spring and favorably transmits the predetermined test force, which is cumbersome.

In addition, examples of a spring member in which the elastic deformation is a linear motion rather than an arc-like motion may include a coil spring, but a coil spring may produce friction arising from expansion and compression of the coil spring, and therefore a mechanism must be added to the test force generating mechanism that cancels out the friction, for example, and favorably transmits the predetermined test force, which is cumbersome.

In view of the above, and after extensive investigations by the inventors of the present invention, the inventors developed a technology that is capable of generating a highly accurate test force through elastic deformation that is unlikely to produce friction and deformation of a spring by linear motion.

SUMMARY OF THE INVENTION

The present invention provides a hardness tester that is capable of favorably performing a hardness test.

In order to resolve the above-noted issues, an invention according to one aspect of the present invention is a hardness tester measuring hardness of a sample by loading a predetermined test force onto a surface of the sample using an indenter to form an indentation, the hardness tester including: a sample stage on which the sample is placed; an indenter column provided with the indenter at a distal end; a load applier that linearly displaces the indenter column toward the sample stage so as to press the indenter into the surface of the sample; a test force generating spring that is interposed between the load applier and the indenter column; a spring displacement detector detecting a displacement amount of the test force generating spring that occurs when the indenter is pressed into the sample via the indenter column; and an indenter column displacement detector detecting a displacement amount of the indenter column that occurs when the indenter is pressed into the sample. The test force generating spring includes a left/right pair of through-holes that are formed running from one side surface of a substantially rectangular metal block to another opposite side surface of the block, and a slit that is formed so as to connect the pair of through-holes. The test force generating spring has a left/right symmetrical shape. The indenter column is fixed to substantially a center of a bottom surface of the test force generating spring, and the load applier is fixed to substantially a center of a top surface of the test force generating spring.

According to another aspect of the present invention, in the hardness tester described above, a groove that follows the left/right pair of through-holes is formed in at least one of the top surface and bottom surface of the test force generating spring. In this example, a portion in the top surface or bottom surface of the test force generating spring where the groove is formed following the through-hole is more thin-walled.

According to another aspect of the present invention, in the hardness tester described above, a plurality of substantially spectacles-like through-holes, each configured by the left/right pair of through-holes and the slit, are provided to the test force generating spring in a vertically stacked arrangement. A pair of parallel through-holes formed to follow the left/right pair of through-holes and a dividing slit that is formed so as to vertically divide a region to the outside of the pair of parallel through-holes are provided between the substantially spectacles-like through-holes. In this example, a portion between the substantially spectacles-like through-holes of the test force generating spring where the pair of parallel through-holes are formed following the pair of through-holes is more thin-walled. The parallel through-holes and the dividing slit may also have gaps with identical dimensions.

According to the present invention, a highly accurate test force can be generated and a hardness test can be favorably performed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of a hardness tester according to the present invention is described in detail with reference to the drawings. Various technically preferred limitations are applied to the embodiment described below in order to embody the present invention, but the scope of the present invention is not limited by the following embodiment nor the illustrated examples. The hardness tester according to the present embodiment is a Rockwell hardness tester that measures hardness of a sample by loading a predetermined test force on a surface of the sample with an indenter to form an indentation.

Figure 1:
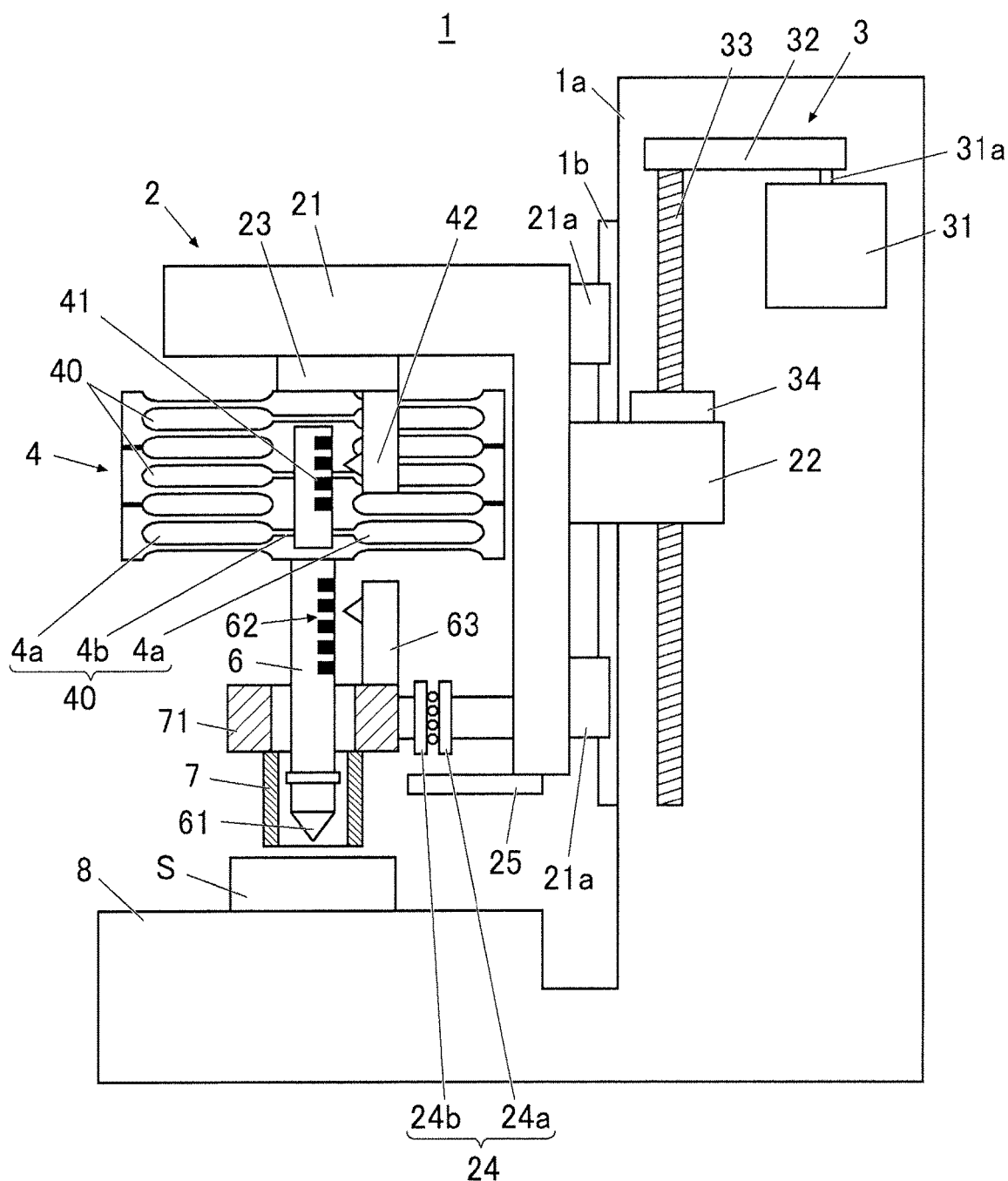
FIG. 1 is a schematic view illustrating an overall configuration of a hardness tester according to an embodiment.
Figure 2:
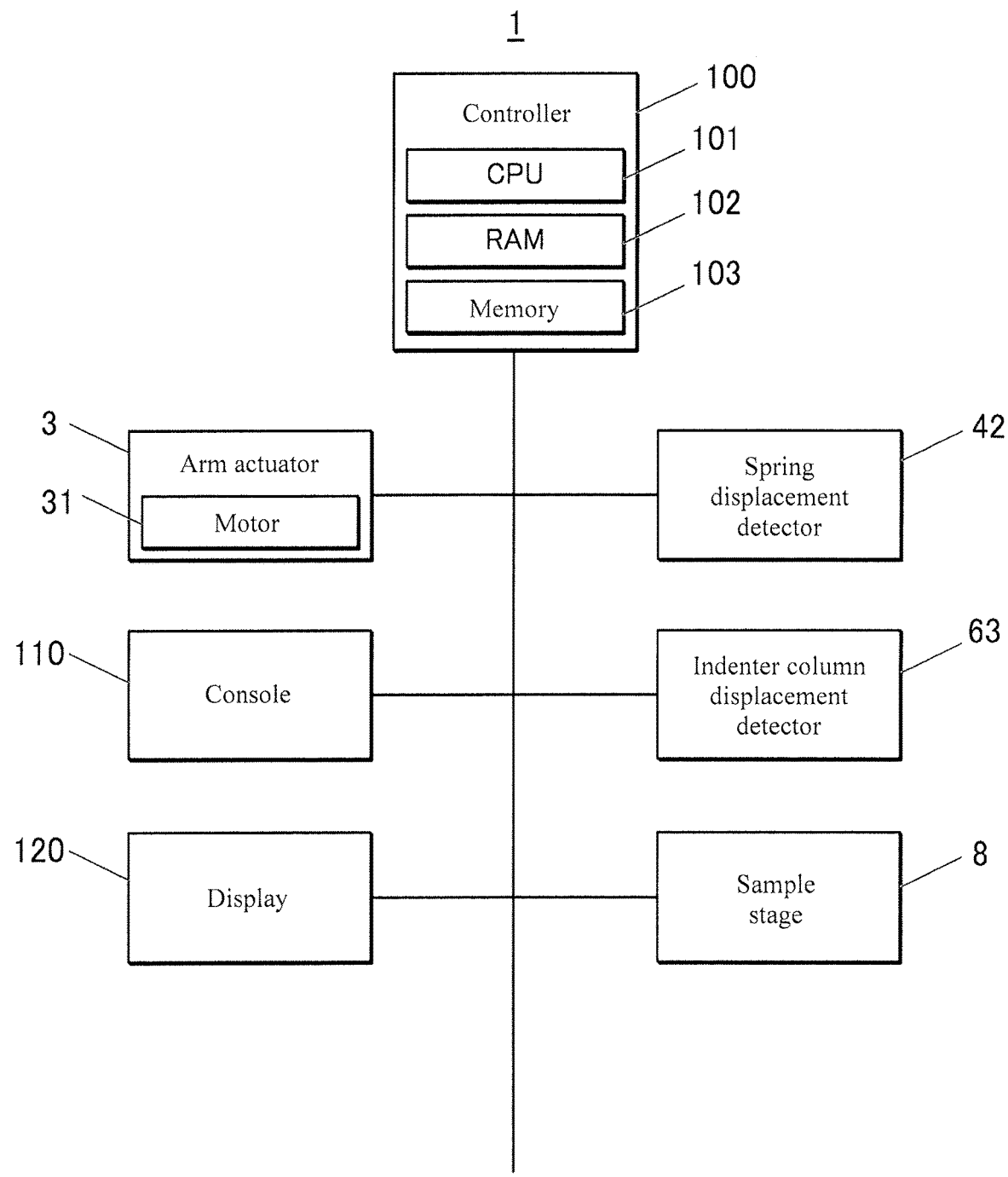
FIG. 2 is a block diagram of a control structure of the hardness tester according to the embodiment.

As illustrated in FIGS. 1 and 2, for example, a hardness tester 1 according to the present embodiment is configured to include a load applier (load applying machine or press) 2, an actuator 3 that applies an operating force to the load applier 2 and causes the load applier 2 to operate (move vertically), a test force generating spring 4 that is provided to a bottom surface side of the load applier 2, an indenter column (indenter shaft) 6 that is arranged on a bottom surface side of the test force generating spring 4 and is provided with an indenter 61 on a distal end portion of a bottom end of the indenter column 6, a reference portion 7 having a reference surface used when detecting an amount of displacement of the indenter column 6 (amount of penetration by the indenter 61), a sample stage 8 that is arranged opposite the indenter column 6 (indenter 61) and that has a sample S placed on a top surface thereof, a controller 100, a console 110, a display 120, and the like. Various operation controls in the hardness tester 1 are carried out by the controller 100 illustrated in FIG. 2.

The load applier 2 is provided with a loader main body 21, a projecting portion 22 that projects from a side surface of the loader main body 21, a base portion 23 that is affixed to a bottom surface of the loader main body 21 and to a top surface of the test force generating spring 4, and the like. In addition, a linking mechanism 24 is provided to the bottom side of the loader main body 21 of the load applier 2, the linking mechanism 24 linking the load applier 2 with a reference portion holding member 71 (the reference portion 7).

The projecting portion 22 of the load applier 2 is attached, via a movable piece 34, to a column shaft 33 of the actuator 3 so as to be capable of moving vertically. The projecting portion 22 (load applier 2) moves vertically, together with the movable piece 34, due to rotational driving of the column shaft 33 that is described below. Specifically, accompanying operation of the actuator 3, the load applier 2 moves vertically by way of a ball screw-like mechanism. A guide 21a that is provided to the loader main body 21 is configured to be guided on a perpendicular rail 1b that is provided to a tester casing 1a, and the load applier 2 moves linearly upward and downward.

The actuator 3 is provided with a motor 31, the column shaft 33, a timing belt 32 that spans between the column shaft 33 and a motor shaft 31a of the motor 31, and the like. The actuator 3 is connected to the load applier 2 by attaching the column shaft 33 to the projecting portion 22 with the movable piece 34.

The motor 31 creates drive based on a drive control signal that is input from the controller 100. The motor shaft 31a of the motor 31 rotates due to the drive of the motor 31. Drive force of the motor shaft 31a is transmitted via the timing belt 32 to the column shaft 33, causing the column shaft 33 to rotate. Due to the rotational drive of the column shaft 33, the movable piece 34 displaces vertically. In this way, the actuator 3 causes the movable piece 34 to move vertically based on the drive of the motor 31, causes the drive force thereof to be transmitted to the projecting portion 22 of the load applier 2 that is connected to the movable piece 34, and causes the load applier 2 to move vertically. Also, the load applier 2 that is moved vertically by the actuator 3 displaces the indenter column 6 linearly toward the sample stage 8 such that the indenter 61 presses into the surface of the sample S.

The test force generating spring 4 that generates a test force is arranged on a bottom surface of the base portion 23 of the load applier 2, and the indenter column 6 is arranged on the bottom surface of the test force generating spring 4. That is, the test force generating spring 4 is interposed between the load applier 2 (base portion 23) and the indenter column 6. The test force generating spring 4 presses and displaces the indenter column 6 downward accompanying the downward displacement of the load applier 2. Specifically, the test force generating spring 4 transmits an operation such as the vertical movement of the load applier 2 to the indenter column 6. The test force generating spring 4 is an annular spring having a shape that is left/right symmetrical. The specific shape and other details of the test force generating spring 4 are described below.

In addition, a scale 41 having scale marks carved therein at a predetermined interval is provided to a side surface of a bottom portion of the test force generating spring 4. Also, a spring displacement detector 42 is provided to an end of the bottom surface of the base portion 23 of the load applier 2, the spring displacement detector 42 detecting a displacement amount (amount of deformation) of the test force generating spring 4 that occurs when the load applier 2 is operated (moves vertically). The spring displacement detector 42 is, for example, a linear encoder that optically reads the scale marks of the scale 41 provided to the test force generating spring 4. The spring displacement detector 42 detects the displacement amount of the test force generating spring 4 that occurs when the indenter 61 is pressed into the sample S by way of the indenter column 6, for example, and outputs to the controller 100 a spring displacement signal that is based on the detected displacement amount. The displacement amount corresponds to a pressing force (test force) with which the indenter 61 presses into the sample S or to a load that is applied to the sample S.

By operation of the actuator 3, the indenter column 6, together with the load applier 2 and the test force generating spring 4, displaces toward the sample S that is placed on the sample stage 8 provided below the indenter column 6 and presses the indenter 61 at the distal end thereof against the surface of the sample S with a predetermined test force. The indenter 61 presses against the sample S with the predetermined test force, thereby forming an indentation in the surface of the sample S. A diamond conical indenter having a point angle of 120° or ball indenter (for example, an indenter having a diameter of 1/16 inch, 1/8 inch, 1/4 inch, or 1/2 inch) which are used in Rockwell hardness tests may be used as the indenter 61, for example. In addition, a scale 62 may be integrally formed on the surface of indenter column 6, the scale 62 having scale marks carved therein at a predetermined interval.

Furthermore, the reference portion holding member 71 that is connected via the linking mechanism 24 provided to the loader main body 21 of the load applier 2, the reference portion 7 that is held on a bottom surface side of the reference portion holding member 71, and the like are provided below the test force generating spring 4. The reference portion 7 includes a reference surface used when the indenter column displacement detector 63 (described below) detects the amount of displacement of the indenter column 6. The linking mechanism 24 is configured by a guide rail 24a arranged on the loader main body 21 side and a guide block 24b arranged on the reference portion holding member 71 side. The guide block 24b is arranged so as to be capable of vertical movement along the guide rail 24a, which extends vertically. The guide rail 24a and the guide block 24b configure what is known as an LM guide (registered trademark), which guides linear motion by the guide block 24b sliding over the guide rail 24a. The specific configuration of the LM guide (guide rail 24a and guide block 24b) is a conventionally known technology (for example, Japanese Patent Laid-open Publication No. 2011-012735) and therefore is not described in detail. Also, a regulator 25 that regulates the downward displacement of the guide block 24b is provided to a bottom end portion of the loader main body 21. With the above-noted configuration, the reference portion holding member 71 (the reference portion 7) can displace vertically along the guide rail 24a.

The reference portion 7 is a member that serves as a vertical direction positioning reference of the distal end of the indenter 61 provided to the distal end portion of the indenter column 6, and is attached to the bottom surface side of the reference portion holding member 71. The reference portion 7 is formed in a hollow shape that allows the indenter column 6 (indenter 61) to be inserted through the reference portion 7. A bottom surface of the reference portion 7 is formed to be a surface perpendicular to the indenter column 6 (a horizontal surface). By displacing the reference portion 7 downward together with the reference portion holding member 71 and the load applier 2, a state can be achieved where the bottom surface of the reference portion 7 is in direct contact against the surface of the sample S.

Additionally, the indenter column displacement detector 63 that detects the amount of displacement of the indenter column 6 is provided to a top surface side of the reference portion holding member 71. The indenter column displacement detector 63 is, for example, a linear encoder that optically reads the scale marks of the scale 62 that is integrally provided to the surface of the indenter column 6. The indenter column displacement detector 63 detects the displacement amount of the indenter column 6 that occurs when the indenter 61 is pressed into the sample S (that is, the penetration amount (pressing depth) of the indenter 61 that is pressed into the sample S) and outputs to the controller 100 an indenter column displacement signal that is based on the detected displacement amount.

Also, by performing a pressing test in a state where the bottom surface of the reference portion 7 is in direct contact with the surface of the sample S, the indenter column displacement detector 63 can detect the amount of displacement of the indenter column 6 using the bottom surface of the reference portion 7 (that is, the surface of the sample S) as a reference surface. Accordingly, the penetration amount of the indenter 61 from the surface of the sample S can be detected with the indenter column displacement detector 63, enabling the depth of an indentation formed during the test to be detected.

As illustrated in FIG. 2, the controller 100 is configured to include a CPU 101, a RAM 102, and a memory 103, for example. The controller 100 performs operation control and the like for performance of a predetermined hardness test by executing a predetermined program stored in the memory 103. The CPU 101 retrieves a processing program or the like that is stored in the memory 103, then opens and executes the processing program in the RAM 102, thereby performing overall control of the hardness tester 1. The RAM 102 opens the processing program or the like that is executed by the CPU 101 in a program storage region within the RAM 102 and stores in a data storage region input data, processing results generated during execution of the processing program, and the like. The memory 103 includes, for example, a recording medium (not shown in the drawings) storing a program, data, and the like. The recording medium is configured with a semiconductor memory, for example. In addition, the memory 103 stores various kinds of data, various kinds of processing programs, and data processed by running the programs that allow the CPU 101 to perform overall control of the hardness tester 1.

For example, the CPU 101 compares the spring displacement signal that is input from the spring displacement detector 42 with preset spring displacement data. Then, the CPU 101 outputs a drive control signal that controls driving of the actuator 3 (motor 31) to the motor 31 in order to displace the load applier 2 so as to cause the indenter 61 to act on the sample S with the predetermined test force (load).

In addition, the CPU 101 calculates the hardness of the sample S based on the indenter column displacement signal that is input from the indenter column displacement detector 63. That is, the CPU 101, as a hardness calculator, performs a Rockwell hardness test, in which the hardness of the sample S is calculated from the displacement amount of the indenter column 6 (in other words, the penetration amount (indentation depth) by which the indenter 61 presses into the sample S) that is detected by the indenter column displacement detector 63.

The console 110 is provided with a keyboard, a pointing device such as a mouse, and the like. The console 110 receives an input operation by a worker (operator) during a hardness test. In addition, when the console 110 receives a predetermined input operation performed by the worker, a predetermined operation signal corresponding to the input operation is generated and output to the controller 100.

The display 120 is configured by a display device such as an LCD, for example. The display 120 displays, for example, hardness test settings input on the console 110, results of the hardness test, and the like.

Next, the test force generating spring 4 of the hardness tester 1 according to the present embodiment is described.

Figure 3A:
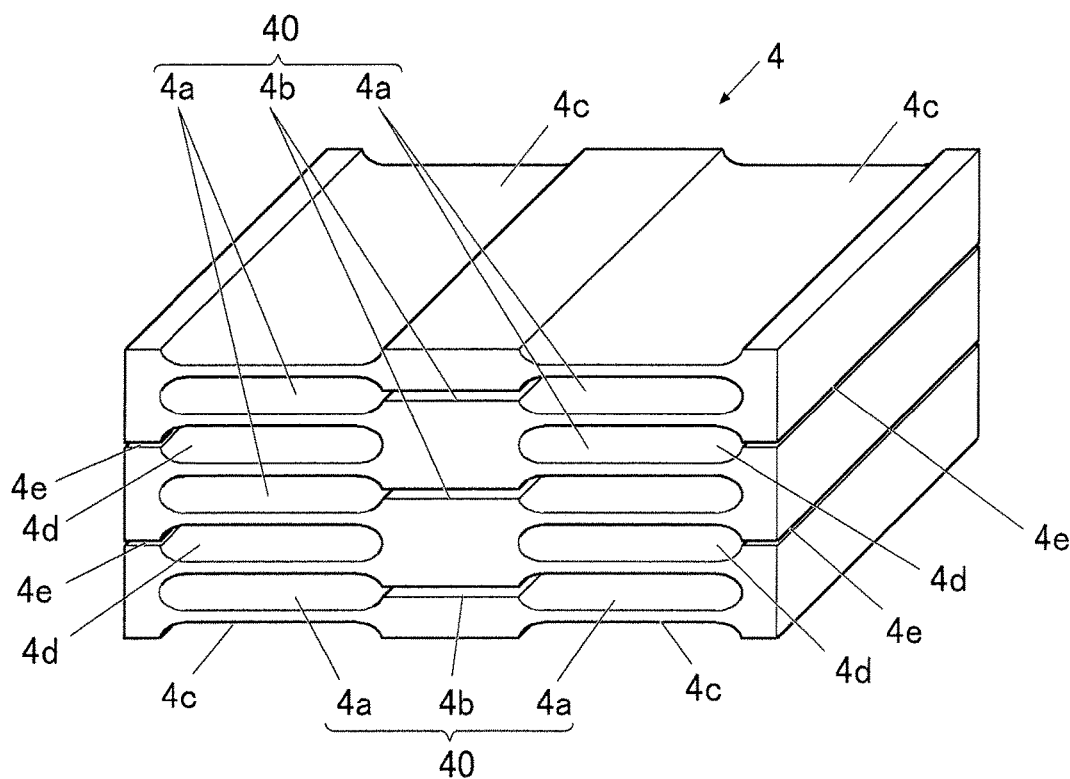
FIG. 3A is a perspective view illustrating a test force generating spring provided to the hardness tester according to the embodiment.

As illustrated in FIGS. 1 and 3A, for example, the test force generating spring 4 is an annular spring having left/right pairs of through-holes 4a where each through-hole 4a is formed running from one side surface of a substantially rectangular metal block to another side surface on a rear side of the block, and a slit 4b that is formed so as to connect each pair of through-holes 4a. Specifically, three substantially spectacles-like through-holes (vertically stacked through-holes) 40, each configured by a left/right pair of through-holes 4a and a slit 4b, are provided to the test force generating spring 4 in a vertically stacked arrangement. A pair of parallel through-holes 4d formed to follow the left/right pair of through-holes 4a and a dividing slit 4e that is formed so as to vertically divide a region to the outside of the pair of parallel through-holes 4d are provided between the spectacles-like through-holes 40. In addition, grooves 4c that follow the left/right pair of through-holes 4a are provided in the top surface and bottom surface of the test force generating spring 4.

In the test force generating spring 4, the metal material is more thin-walled in portions where the through-hole 4a, the parallel through-hole 4d, and the groove 4c are vertically stacked. Specifically, the metal material is more thin-walled between the through-hole 4a and the parallel through-hole 4d and the metal material is more thin-walled between the through-hole 4a and the groove 4c. In other words, the test force generating spring 4 has a spring structure in which portions where the through-hole 4a, the parallel through-hole 4d, and the groove 4c are formed are more thin-walled than both left and right sides and the center of the test force generating spring 4.

Furthermore, (the base portion 23 of) the load applier 2 is affixed to substantially the center (i.e., an approximate center) of the top surface of the test force generating spring 4, and the indenter column 6 is fixed to substantially the center (i.e., an approximate center) of the bottom surface of the test force generating spring 4 (see FIG. 1). Also, the load applier 2 (the base portion 23) is affixed to a thick-walled portion at substantially the center of the top surface of the test force generating spring 4, and the indenter column 6 is fixed to a thick-walled portion at substantially the center of the bottom surface of the test force generating spring 4. With this connection structure, when the test force generating spring 4 is interposed between the load applier 2 and the indenter column 6, the load applier 2 is displaced downward by the actuator 3 and linearly displaces the indenter column 6 so as to press the indenter 61 into the surface of the sample S, and the elastic deformation that occurs during this linear displacement is a linear motion, enabling the test force to be favorably generated. For example, in a hardness tester using conventional technology, by deforming a cantilever plate spring, a test force of 3 to 187.5 kgf can be generated; a test force having a broad dynamic range of 1 to 250 kgf, which exceeds the conventional test force, can be generated by the linear motion deformation of the test force generating spring 4. In particular, when the test force generating spring 4 that is interposed between the load applier 2 and the indenter column 6 moves linearly to compress (is elastically deformed) between these components, no force other than the test force (such as friction) is produced in the test force generating spring 4, and therefore the test force generating spring 4 can generate the test force with a high degree of accuracy.

Figure 3B:
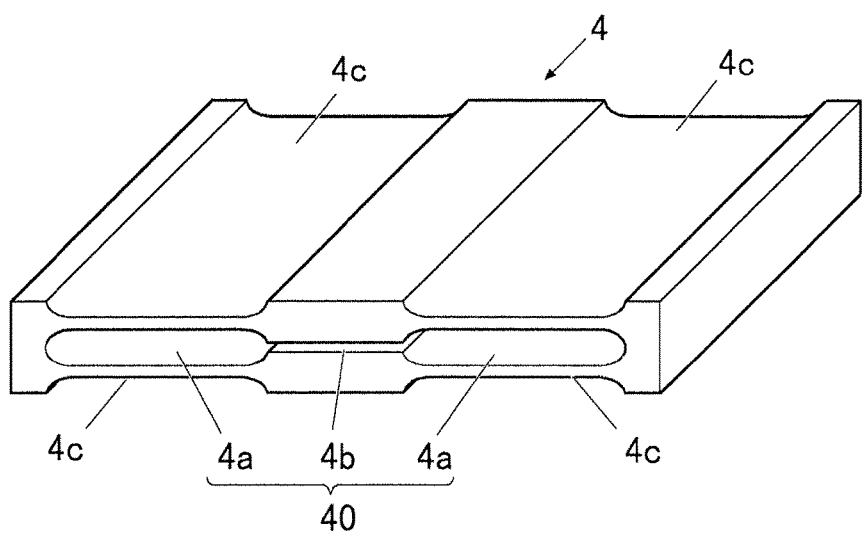
FIG. 3B is a perspective view illustrating a basic structure of the test force generating spring.

In this example, the test force generating spring 4 illustrated in FIG. 3A is an annular spring with the test force generating spring 4 illustrated in FIG. 3B as the basic structure. The test force generating spring 4 of FIG. 3B that serves as the basic structure is an annular spring having one substantially spectacles-like through-hole 40 configured by one left/right pair of through-holes 4a, where each through-hole 4a is formed running from one side surface of a substantially rectangular metal block to another side surface on the rear side of the block, and one slit 4b that is formed so as to connect the pair of through-holes 4a, and the grooves 4c that follow the left/right pair of through-holes 4a are formed on the top surface and bottom surface of the test force generating spring 4. In other words, in the present embodiment, the annular spring is designed around how many substantially spectacles-like through-holes 40 the test force generating spring 4 has, and when the test force generating spring 4 having the basic structure illustrated in FIG. 3B is treated as an annular spring having a one-story structure, the test force generating spring 4 illustrated in FIG. 3A is equivalent to an annular spring have a three-story structure. When a design stacks the test force generating spring 4 having the basic structure illustrated in FIG. 3B into many stories, the parallel through-holes 4d are designed to correspond to portions where the grooves 4c are stacked facing each other.

With the test force generating spring 4 that is designed to have the annular spring with the basic structure (see FIG. 3B) stacked in multiple stories in this way, a design is possible in which the spring constant of the test force generating spring 4 can be easily calibrated. For example, when the spring constant of the test force generating spring 4 with the one-story structure illustrated in FIG. 3B is 100 (kgf/mm), the spring constant of the test force generating spring 4 with the three-story structure illustrated in FIG. 3A is approximately one-third, or 30 [kgf/mm]. In other words, the spring constant can be decreased as the number of stories of the annular spring having the basic structure is increased, and therefore test force generating springs 4 having various numbers of stories (for example, a two-story structure or a four-story structure) can be designed to obtain test force generating springs 4 with various spring constants.

In addition, when a testing apparatus is designed that is standardized except for the portions where the test force generating spring 4 is installed in the hardness tester 1, and a test force generating spring 4 with the number of stories having a spring constant in line with the user's desire is installed in the testing apparatus to complete the hardness tester 1, various types of the hardness tester 1 can be manufactured easily, and therefore manufacturing costs of the hardness tester 1 can be reduced.

With the hardness tester 1 using the test force generating spring 4 of this kind, a hardness test can be carried out favorably.

At this point, testing conducted by the inventors of the present invention is described, with reference to a coil spring configured to have elastic deformation be linear motion. The inventors hypothesized that similar effects could be achieved when a coil spring was installed instead of the test force generating spring 4 of the hardness tester 1 according to the present embodiment, but since the elastic deformation of the coil spring includes elements other than linear motion, the inventors reached a conclusion that there was no benefit to using the coil spring instead of the test force generating spring 4 according to the present embodiment. Specifically, the inventors discovered that when a coil spring formed by winding a metal wire is compressed, torsional deformation along a winding direction of the metal wire is generated, and therefore a mechanism to avert such torsion would have to be added. The inventors determined that this was a detriment similar to the inconvenience of having to add a mechanism to offset a shift in the position of a free end of a cantilever plate spring in a hardness tester according to conventional technology. Also, with a coil spring having a fewer number of twists and a smaller pitch between twists in the metal wire, there was almost no buckling when the coil spring was compressed, but buckling deformation did occur when compressing a coil spring having a certain degree of length. Therefore, the inventors determined that a mechanism to prevent such buckling would have to be added. In this way, the inventors discovered that when a coil spring is used instead of the test force generating spring 4, there is the inconvenience of having to add a mechanism to avert torsion or a mechanism to prevent buckling. Additionally, the inventors also learned that when a mechanism to avert torsion or a mechanism to prevent buckling is added, there is the potential for friction generated by such mechanisms to affect the accuracy of the test force. Given the results of these tests, the inventors concluded that the test force generating spring 4 according to the present embodiment can generate a highly accurate test force that is not achievable with a coil spring.

As noted above, no force (such as friction) other than the test force is produced in the test force generating spring 4 according to the present embodiment, and the test force generating spring 4 can generate a highly accurate test force. Therefore, a hardness test can be performed favorably with the hardness tester 1 using the test force generating spring 4.

In the embodiment given above, the groove 4c is formed on each of the top surface and bottom surface of the test force generating spring 4. However, the present invention is not limited to this. A pair of grooves 4c may be formed on only the top surface of the test force generating spring 4, or a pair of grooves 4c may be formed on only the bottom surface of the test force generating spring 4. In addition, the test force generating spring 4 may have no groove 4c formed thereon.

Furthermore, in the embodiment above, the parallel through-holes 4d in the test force generating spring 4 have a gap that is roughly the same size as that of the through-holes 4a, and the parallel through-holes 4d have a gap that is broader than that of the dividing slits 4e. However, the present invention is not limited to this. For example, the gap of the parallel through-holes 4d may be narrow, or may be the same as the dividing slits 4e.

In addition, the embodiment above is configured to have the scale 41 provided on the side surface of the bottom portion of the test force generating spring 4, and to have the spring displacement detector 42 that reads the scale marks of the scale 41 provided on the bottom surface of the reference portion 23 of the load applier 2. However, the present invention is not limited to this. The scale 41 and the spring displacement detector 42 may be arranged at any other position where the scale 41 and the spring displacement detector 42 function appropriately.

Moreover, appropriate modifications to other specific fine points of the structure are, of course, also possible.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A hardness tester for measuring hardness of a sample, the hardness tester comprising:
    a stage on which the sample is placed;
    an indenter shaft having an indenter at a distal end thereof;
    a press that linearly displaces the indenter shaft toward the stage so as to press the indenter into a surface of the sample;
    a test force generating spring having a left/right symmetrical shape and positioned between the press and the indenter shaft, the test force generating spring comprising:
        a left/right pair of through-holes that are formed running from one side surface of a substantially rectangular metal block to another opposite side surface of the block; and
        a slit that is formed so as to connect the left/right pair of through-holes;
    a spring displacement detector that detects a displacement amount of the test force generating spring that occurs when the indenter is pressed into the sample via the indenter shaft; and
    an indenter shaft displacement detector that detects a displacement amount of the indenter shaft that occurs when the indenter is pressed into the sample,
    wherein the indenter shaft is fixed to an approximate center of a bottom surface of the test force generating spring, and the press is fixed to an approximate center of a top surface of the test force generating spring.

2. The hardness tester according to claim 1, wherein a groove that follows the left/right pair of through-holes is formed in at least one of the top surface and bottom surface of the test force generating spring.

3. The hardness tester according to claim 2, further comprising:
    a plurality of vertically stacked through-holes, each comprised of the left/right pair of through-holes and the slit, provided to the test force generating spring in a vertically stacked arrangement, and
    a pair of parallel through-holes and a dividing slit, each provided between the vertically stacked through-holes, wherein:
        the pair of parallel through-holes are formed to follow the left/right pair of through-holes, and
        the dividing slit is formed so as to vertically divide a region at the outside of the pair of parallel through-holes.

4. The hardness tester according to claim 1, further comprising:
    a plurality of vertically stacked through-holes, each comprised of the left/right pair of through-holes and the slit, provided to the test force generating spring in a vertically stacked arrangement, and
    a pair of parallel through-holes and a dividing slit, each provided between the vertically stacked through-holes, wherein:
        the pair of parallel through-holes are formed to follow the left/right pair of through-holes, and the dividing slit is formed so as to vertically divide a region at the outside of the pair of parallel through-holes.

* * * * *